(12) United States Patent
Tenias Sancho (10) Patent No.: US 9,894,840 B2
(45) Date of Patent: Feb. 20, 2018

(54) SELF-PROPELLED TREE FRUIT PICKING MACHINE

(71) Applicant: TENIAS, S. A., Zaragoza (ES)

(72) Inventor: Jesus Tenias Sancho, Zaragoza (ES)

(73) Assignee: TENIAS, S.A., Zaragoza (ES)

( * ) Notice: Subject to any disclaimer, the term of this patent is extended or adjusted under 35 U.S.C. 154(b) by 0 days.

(21) Appl. No.: 15/158,651

(22) Filed: May 19, 2016

(65) Prior Publication Data

US 2017/0238466 A1     Aug. 24, 2017

(30) Foreign Application Priority Data

Feb. 24, 2016   (ES) .................................. 201630205

(51) Int. Cl.
*A01D 46/00*   (2006.01)
*A01D 46/26*   (2006.01)

(52) U.S. Cl.
CPC .................................. *A01D 46/264* (2013.01)

(58) Field of Classification Search
CPC .. A01D 2046/262; A01D 46/26; A01D 46/28; A01D 46/264; A01D 46/285
USPC .................................................. 56/330, 340.1
See application file for complete search history.

(56) References Cited

U.S. PATENT DOCUMENTS

| | | | | |
|---|---|---|---|---|
| 3,276,194 A * | 10/1966 | Mohn | ............ | A01D 46/005 56/330 |
| 3,473,310 A * | 10/1969 | Christianson | ......... | A01D 46/26 56/329 |
| 3,793,814 A * | 2/1974 | Rohrbach | ............ | A01D 46/28 56/1 |
| 3,901,005 A * | 8/1975 | Rohrbach | ............ | A01D 46/28 141/324 |
| 5,074,107 A * | 12/1991 | Windemuller | ......... | A01D 46/28 56/12.8 |
| 5,259,177 A * | 11/1993 | Windemuller | ....... | A01D 46/285 56/12.8 |
| 6,360,518 B1 * | 3/2002 | Scott | ................... | A01D 46/264 180/435 |
| 6,745,551 B2 * | 6/2004 | Stackhouse | ........... | A01D 46/26 56/340.1 |
| 7,748,206 B1 * | 7/2010 | Posselius | ............... | A01D 46/28 56/328.1 |

(Continued)

FOREIGN PATENT DOCUMENTS

ES          1047707          5/2001

*Primary Examiner* — Arpad Fabian-Kovacs
(74) *Attorney, Agent, or Firm* — The Morales Law Firm, LLC; Joseph L. Morales (57) ABSTRACT

A self-propelled tree fruit picking machine, of the type which includes a vibrator device which acts on the trunk of a tree detected by a probe device. The picking machine includes two side frames joined by a transverse gantries device, equipped with transporting devices to move the fruit towards peeling devices, and from these towards hoppers. Each gantry includes four successively articulated segments with anchoring devices between adjacent segments, which are extractable to fold the machine by closing together both side frames via the action of cylinders to a minimum width. The machine is further equipped with a control cabin which can be moved inwards to the position of minimum width, and with the transport wheels connected to suspension devices adjustable in height via cylinders.

5 Claims, 6 Drawing Sheets

(56) References Cited

U.S. PATENT DOCUMENTS

2002/0029551 A1\* 3/2002 Tenias Sancho ....... A01D 46/26
  56/340.1
2002/0129592 A1\* 9/2002 Scott .................... A01D 46/264
  56/340.1

\* cited by examiner

FIG. 1
(Técnica Anterior)

SELF-PROPELLED TREE FRUIT PICKING MACHINE

FIELD OF THE INVENTION

The present invention refers to a tree fruit picking machine, which provides essential new characteristics and notable advantages with respect to the methods already known and used for the same purposes within the prior art.

More specifically, the invention proposes the development of a self-propelled machine for the picking of tree fruit of the type which uses a vibrating device to act on the trunk of the fruit tree, which is a substantial improvement on other existing machines within the prior art through the inclusion of essential characteristics such as the incorporation of a single probe device, the inclusion of transporter belts which do not damage the fruit, independent adjustable suspension on each of the wheels included in the chassis of the machine for the transport of the same, a laterally moveable cabin providing both a transport position and a working position offering better visibility for the operator, and devices to allow the "folding up" of the machine (through the closing together of both side frames), with a considerable reduction in the width to facilitate transport of the machine and entry into the warehouse.

The field of application of the invention comprises the industrial sector dedicated to the manufacture of fruit picking machines for all types of fruit.

BACKGROUND OF THE INVENTION

Tree fruit picking machines are already known within the prior art. Generally they consist of a rigid structure consisting of two side frames which at the lower part leave an open longitudinal space for the tree trunk to pass through while the machine moves during the picking process, with timed action vibrating elements included within this open longitudinal space, which come into operation when the probes located in the side frames detect the presence of the trunk of a fruit tree. The vibrating action releases the fruit which then falls onto mobile devices which then feed it onto peeling devices which peel the fruit before feeding it into storage hoppers which are hinged for the unloading of the already peeled fruit.

Figure 1:
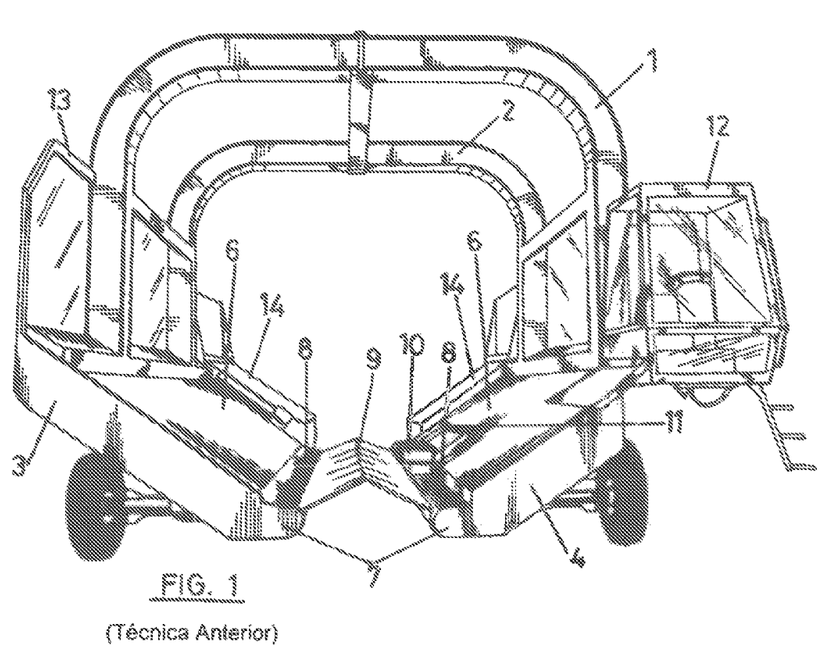
FIG. 1 (already mentioned), shows a schematic representation of a prior art picking machine, described in Utility Model U-200002889.

One example of the picking machine explained above is the machine described in Utility Model U-200002889 issued as Patent ES1047707 on May 1, 2001, shown as prior art in FIG. 1 of the appendix diagrams. In this Figure the picking machine comprises two side frames (3, 4), held together by means of parallel vertical gantries (1,2,) extended above in the crosswise direction to the machine, with two channels (7) in a lower position, with a drive spindle extended through the interior of each (8), with a vibrator (10) mounted on guides (11) allowing transport over a predetermined route, in such a way that when a probe detects the presence of a tree trunk in the longitudinal open space between both channels (7), the vibrator acts in a timed manner on the tree trunk, making the fruit fall onto inclined trays (6) to direct it towards the interior of the channels (7) in which it is transported by the spindles (8) towards the peeling devices (not visible in this Figure), for subsequent storage in the hoppers (14). The machine includes a cabin (12) from which an operator controls the various operations of the machine.

Other components of the machine are also indicated in the Figure described, although they are not alluded to here as not being considered of interest in terms of the present description.

The picking machine described in Utility Model U-200002889 issued as Patent ES1047707 on May 1, 2001, whose principal elements have been summarized above, has perfectly fulfilled the purpose for which it was originally developed, and has enabled fruit picking to be performed in an automated manner, with minimal effects on the integrity of the picked tree.

Meanwhile, the ongoing research conducted by the applicant with the aim of perfecting the already existing machines, has led to the improvement of a series of integral components of the picking machine, which together have resulted in far greater efficiency from an operative point of view, both in terms of the picking operation itself as well as the necessary movement/transport of the machine.

SUMMARY OF THE INVENTION

In this regard, the present invention has introduced a series of very significant improvements to the structural components which benefit the operation and control of the machine and which have been achieved in the following manner:

Use of a single probe for the complete process;

Incorporation of transporter belts in place of spindles for better protection of the picked fruit; Large capacity hoppers;

incorporation of independent hydraulic suspension on each of the wheels for better adaptation to the irregularities of the terrain during picking, or to reach the desired height during transport;

laterally moveable cabin, moved by means of cylinders (either hydraulic or pneumatic, according to suitability), providing two contrasting positions: either in the interior of the machine thus reducing overall width to a minimum, well recommended for transport operations, or in an external position, in other words laterally moved, for a better view of operations by the user and in a manner which does not interfere with tree branches during picking, and a capacity to "fold up" the machine via a hinge effect, to produce the folding up of both gantries towards the interior, with the resulting closing together of the side frames and a reduction in the total width of the machine allowing it to be transported and pass through the doors of the warehouse; the gantries are freed via the extraction of bolts which hold them tight during the operation of the machine, in other words in an unfolded position.

In this manner, the result is a picking machine with the capacity to adapt to varying operative conditions, whether during tree fruit picking operations or during transport and warehouse access.

BRIEF DESCRIPTION OF THE DRAWINGS

These and other characteristics and advantages of the invention are more clearly demonstrated via the detailed description that follows of a preferred embodiment of the same, provided merely as an illustrative and non-definitive example with reference to the accompanying diagrams, in which.

DESCRIPTION OF THE PREFERRED EMBODIMENT

As mentioned in the above, the detailed description of the preferred embodiment of the object of the invention, will be provided below with the help of the appendix diagrams, via which identical or similar parts will be referred to using the same numerical references. In this manner, in reference firstly to FIG. 2 of the diagrams, the schematic representation of a machine consistent with the invention, indicated in general by numerical reference 15, comprising two side frames 16 & 17, separated by an intermediary longitudinal opening of sufficient width to allow the passage of a tree trunk, of normal diameter, between both frames when the machine is moved during tree fruit picking operations (not shown). Each of the side frames 16 & 17 include wheels 18 for transport, with each wheel equipped with independent suspension devices 19, allowing adaptation of the machine to the irregularities of the terrain and the adjustment of height during transport.

Figure 2:
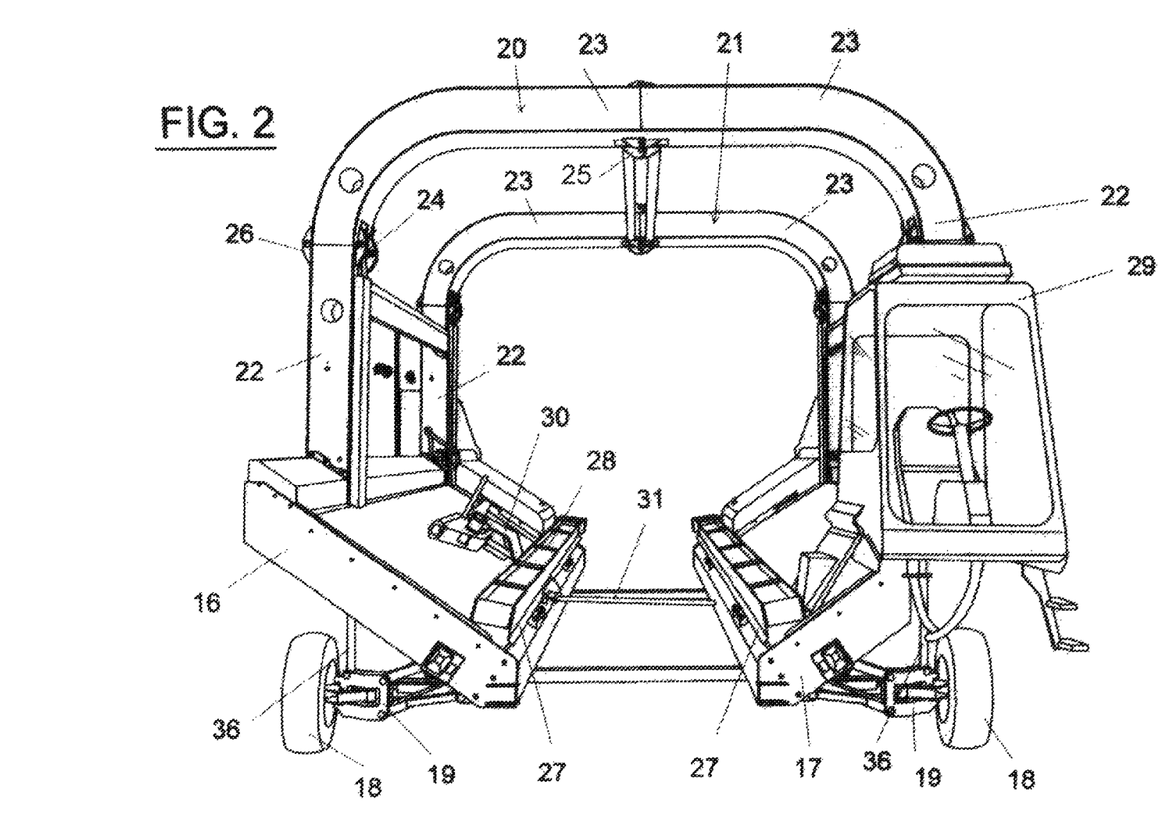
FIG. 2 is a schematic view, seen from the front part of a machine consistent with the invention in its picking state.

The connection between both side frames 16 & 17 is made by means of the parallel gantries 20 & 21, extended in a transverse direction to the machine and separated in a longitudinal direction by a previously fixed distance. Both these gantries are designed in the same manner, in which each one comprises four segments successively articulated between themselves. In reference to gantry 20, for the purposes of description, two of the segments consist of upright struts, each fixed and emerging from the respective side frames 16 & 17, and the other two segments referenced as 23, extend according to the general upper horizontal direction, respectively articulated with the vertical struts 22 at tilting points 24, and with themselves via a hinge point 25 in a central position. This same arrangement can be observed in relation to gantry 21, although the description will be omitted to avoid unnecessary repetition.

In connection with the articulation points 24 & 25, there is a fastening device for each gantry 20 & 21 in its operative state, consisting of two fixation lugs 26, attached to each respective gantry segment, overlaid between each other and equipped with opposing through holes to allow the insertion of anchoring bolts.

Additionally, each of the side frames 16 & 17 of the invention machine includes, in a conventional manner, a channel 27 extended lengthwise, in a position mutually facing both of the frames, in the interior of which is a transporting device 28 for the picked fruit. These transporting devices for the picked fruit, in contrast to the conventional design, consist of transporter belts specifically designed and finished to prevent damage to the detached fruit, which is then pulled towards the rear of the machine where the peeling devices are located (visible in FIG. 4) and the storage hoppers for the peeled fruit (also visible in FIG. 4).

Figure 6:
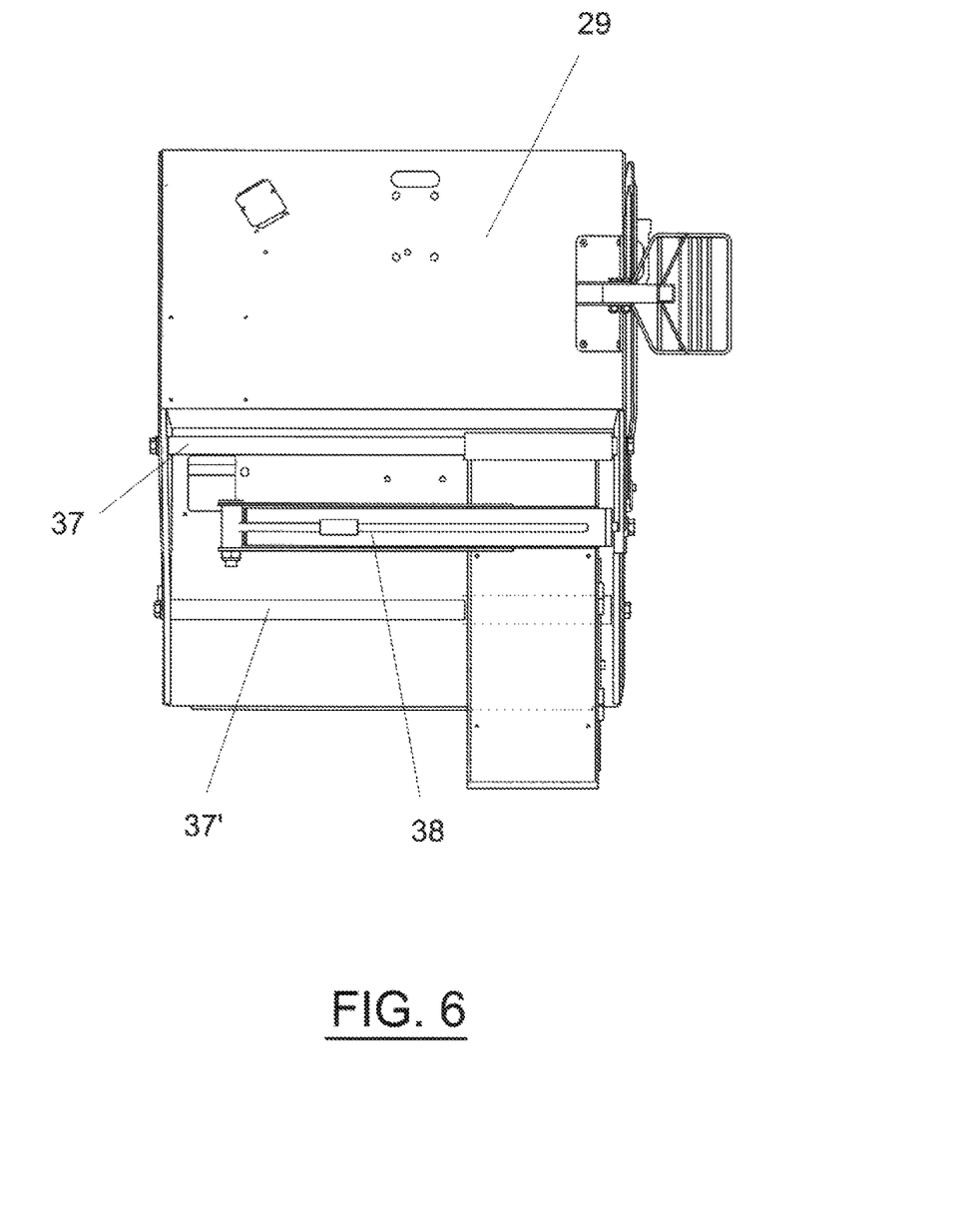
FIG. 6 is a bottom view of the cabin of a machine according to one embodiment.

In addition, the machine includes, as usual, a cabin 29 from which the operator controls the action of the machine at all times during the picking and transport operations, although in the case of the present invention, this cabin 29 is not in a fixed position but can be moved laterally on guide rails (37, 37') towards either the interior or exterior by means of cylinders (38), as shown on FIG. 6. By this means the cabin 29 may adopt an interior position (in other words aligned with the machine as shown in FIG. 2 being described), corresponding to the transport position, that is to say, occupying the minimum width possible, or otherwise in an exterior position (not shown in the Figure), in other words moved to the outside of machine 15, corresponding to the operative state of the said machine and as a result separated from the space provided for the passage of the trees between the two side frames 16 & 17 in a manner so as not to interfere with the branches of the tree. In the representation shown in FIG. 2, the cabin 29 appears located over side frame 17, although this should not be understood to be definitive as it may also be located over the opposite side frame as required.

Finally, as is conventional, the vibrator 30 is situated on one of the sides (in the representation shown in FIG. 2, for illustrative purposes, it appears located over side frame 16), and is designed for attachment to the tree as soon as the presence of a trunk is detected by the single probe 31, with the action of vibrator 30 pre timed. The invention allows the vibrator to be moved via longitudinal guides, via a predetermined path, in the opposite direction to the movement of the machine 15, in a synchronized way in order that the vibrator 30 remains static in relation to the tree to which it is applied for the time fixed by the timer device (not shown) connected to the said vibrator. This action allows a continual operation, in such a way that as soon as the timer period is over, the vibrator 30 releases itself from the tree to which it was applied and returns to its initial position, in order to restart the cycle when the machine reaches a new tree detected by probe 31.

Figure 3:
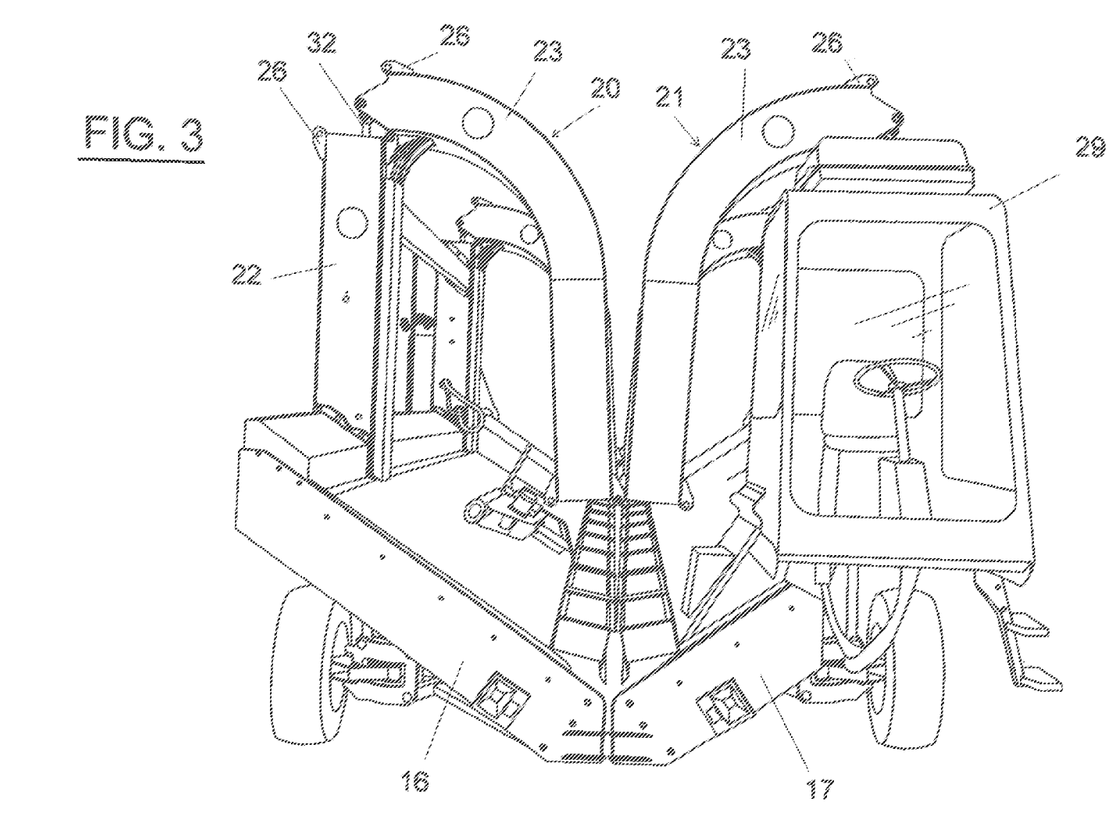
FIG. 3 is a frontal schematic view, equivalent to that of FIG. 2, except that the machine is shown in a fold-up state ready for transport or storage.

In reference to FIG. 3 of the diagrams, one can see a schematic representation of the machine 15, taken from the front, in the folded state of the machine. That is to say in the state in which the upper segments of gantries 20 & 21 have been successively folded in relation to the vertical struts 22. For this purpose it is simply necessary to remove the fastening bolts (not shown) housed in the through holes facing the lugs 26, and via the action of cylinders 2, to provoke the pivoting of each intermediary segment 23 in relation to the other and in relation to the respective vertical struts 22. The folded state shown in the Figure allows one to observe how the side frames 16 & 17 are now in a joined together position, thus reducing the width of the machine to a minimum.

Figure 4:
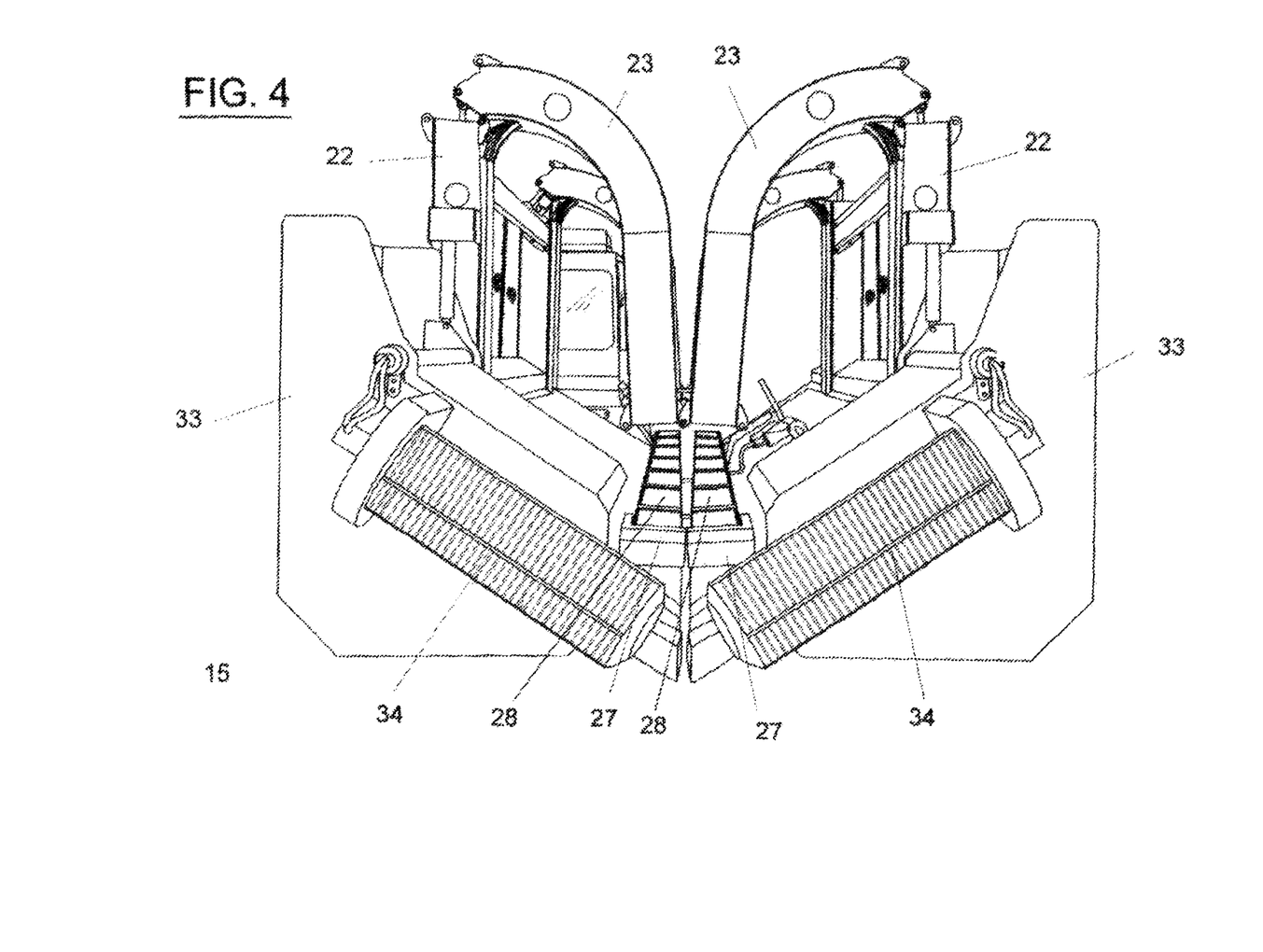
FIG. 4 is a schematic view of the machine in FIGS. 2 & 3, taken from the rear and in fold-up position.

FIG. 4 is a schematic representation of the machine in FIGS. 2 & 3, seen from behind, in the folded state. This representation allows one to observe the position of the hoppers 33 (one in each side frame), which are of a much larger size than the hoppers of conventional machines, thus allowing a far greater storage capacity. The transporter belts 28 of each of the lateral channels 27, pull the fruit in the direction of the back end of the machine 15, for the purpose of feeding them into the peeling devices 34 from which they are fed, once peeled, into both hoppers 33.

Figure 5:
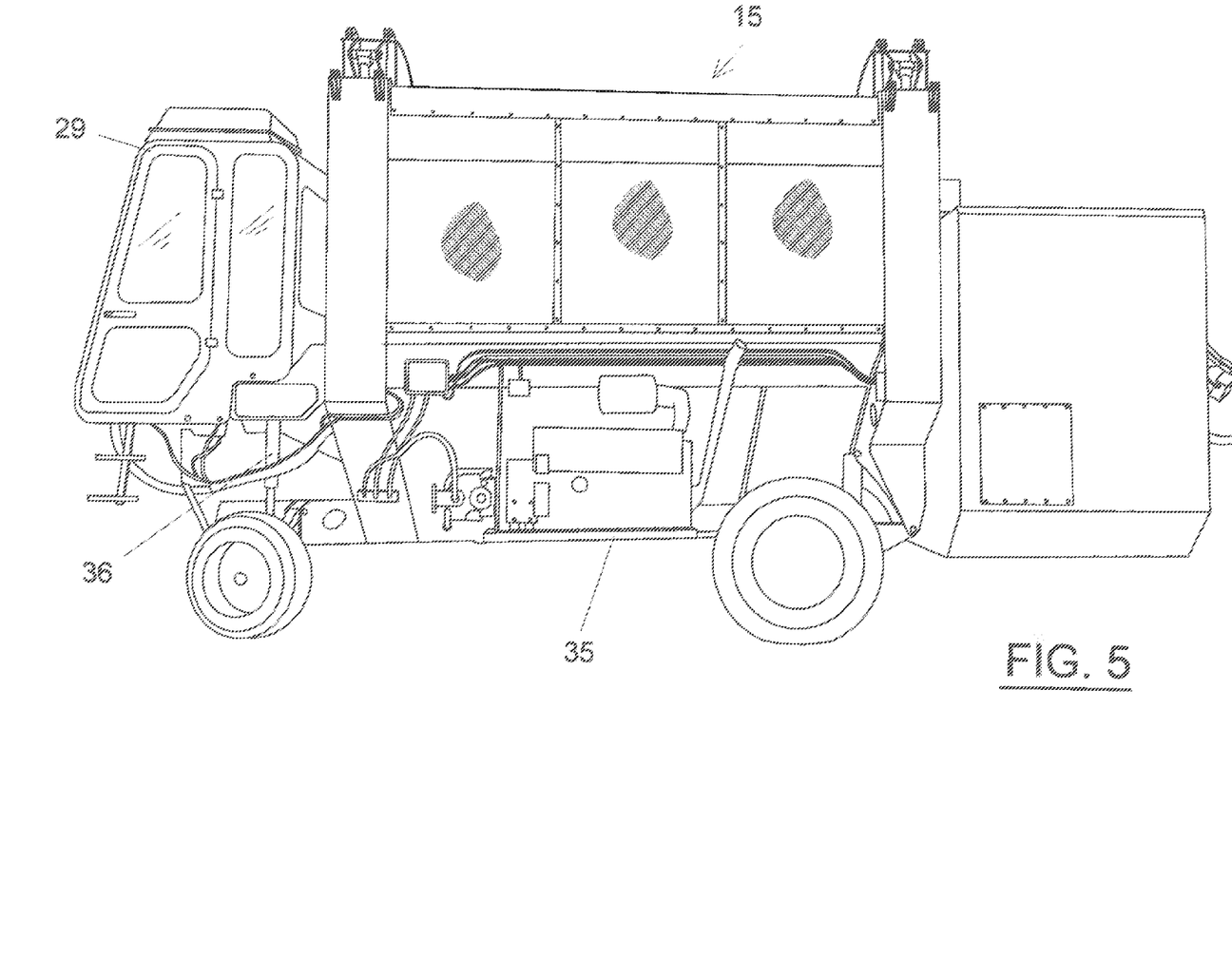
FIG. 5 is a side elevation view of a machine according to the invention, ready to be transported to other locations.

As previously mentioned, the present invention machine is of a self-propelled type. FIG. 5 of the diagrams shows the state of the machine ready to be transported to any location (another place of work, transport to the warehouse etc.), where the structure of the machine is mounted on a platform 35 sustained by the wheels 18 attached to each of the side frames 16 & 17. In the representation it can be observed that the machine is at a predetermined height from the floor, which can be achieved by means of the independent suspensions 19 attached to each wheel, thanks to each of the suspensions 19 including a cylinder 36 (also visible in FIG.

2), which raises the said platform to a predetermined height. The elevation operation for the movement and transport and the return to the operative height when necessary, is controlled by the operator from cabin 29.

It should be clarified that the numerical references of the present invention have been assigned starting with reference number 15 for the sole purpose of avoiding confusion with the reference numbers of FIG. 1 illustrating an equivalent machine from the prior art.

It has not been considered necessary to expand the content of the present description any further in order for an expert in the subject to understand its scope and the advantages deriving from the same, and to produce a practical embodiment of its object.

Notwithstanding the above, and given that the description provided solely corresponds to a preferred embodiment example of the invention, it will be understood that within its essential design multiple variants in the detail may be introduced, likewise protected, which may affect the form, size or manufacture materials of the whole or its parts, without this altering the invention in its entirety, which is solely defined by the claims which are provided below.

The invention claimed is:

1. A self-propelled tree fruit picking machine designed for picking tree fruits by an action of a vibrator on a trunk of a tree when presence of the trunk is detected by a probe, the machine comprises:

two side frames between which there is a lower longitudinal opening for passage of the tree in accordance with a movement of the machine, with the side frames joined at a top by using two parallel gantries, extended crosswise and separated by a certain distance in a longitudinal direction;

transporting devices located inside respective longitudinal channels, to move detached fruit towards peeling devices located in a rear part of each of the side frames of the machine, from which the detached fruit is then pulled, once peeled, to two hoppers located in the rear part of each of the frames of the machine; wherein each of two transverse parallel gantries comprising a group of four segments, respectively articulated between each other at hinge points, of which outer segments include fixed vertical struts emerging from each respective side frame and two intermediate segments are articulated with the vertical struts at hinge points, and between themselves through hinge point;

wherein each of the fixed and vertical struts possess fixation lugs attached to the hinge points between consecutive segments, equipped with a through hole, and with the fixation lugs of each of the consecutive segments overlaid between each other to allow the insertion of anchoring bolts through respective facing holes.

2. The tree fruit picking machine according to claim 1, wherein the transporting devices are transporter belts specifically designed to avoid damaging the fruit.

3. The tree fruit picking machine according to claim 1, further including suspension devices connected to transporting wheels, with the suspension devices on each wheel acting independently to facilitate adaptation to irregularities of the terrain, and where each of the suspension devices includes a respective cylinder allowing height adjustment of the machine.

4. The tree fruit picking machine according to claim 1, further comprising a cabin located on one of the said side frames, with a capacity for lateral movement on guide rails, activated by means of a cylinder, between an external or working position, and an interior or transport position, where the cabin is aligned with the rest of the machine.

5. The tree fruit picking machine according to claim 1, wherein the intermediate segments of each of the transverse parallel gantries foldable inwards in relation to the side struts via the removal of the anchoring bolts housed in the facing holes of the fixation lugs, through the action of the cylinders, thereby facilitating the lateral folding of the machine to its minimum width.

\* \* \* \* \*